United States Patent
Carter et al.

(10) Patent No.: US 8,317,135 B2
(45) Date of Patent: Nov. 27, 2012

(54) FLEXIBLE MOUNTING ASSEMBLY FOR AN AIR FRAME STRUCTURE

(75) Inventors: Don E. Carter, Perryville, MO (US); Randy L. Barton, St. Mary, MO (US)

(73) Assignee: Sabreliner Corporation, St. Louis, MO (US)

( * ) Notice: Subject to any disclaimer, the term of this patent is extended or adjusted under 35 U.S.C. 154(b) by 243 days.

(21) Appl. No.: 12/762,921

(22) Filed: Apr. 19, 2010

(65) Prior Publication Data

US 2011/0253834 A1     Oct. 20, 2011

(51) Int. Cl.
*B64C 1/14*     (2006.01)
(52) U.S. Cl. ............... 244/129.5; 244/131; 244/17.11
(58) Field of Classification Search ............... 244/118.5, 244/119, 129.1, 129.4, 129.5, 131, 17.11, 244/118.3, 117 R
See application file for complete search history.

(56) References Cited

U.S. PATENT DOCUMENTS

| | | | | |
|---|---|---|---|---|
| 4,531,695 A * | 7/1985 | Swinfield | ................... | 244/119 |
| 5,024,399 A * | 6/1991 | Barquet et al. | ................ | 244/119 |
| 5,901,519 A * | 5/1999 | Wilson | ................... | 52/506.01 |
| 6,158,690 A * | 12/2000 | Wadey et al. | ............. | 244/17.27 |
| 6,488,235 B1 * | 12/2002 | Young et al. | ............... | 244/129.5 |
| 6,766,985 B2 * | 7/2004 | Dussac et al. | ................ | 244/119 |
| 6,945,727 B2 * | 9/2005 | Christman et al. | ......... | 403/109.8 |
| 7,198,224 B2 * | 4/2007 | Townsend et al. | ......... | 244/17.11 |
| 7,546,979 B1 * | 6/2009 | Estell et al. | ................ | 244/123.1 |
| 8,047,465 B2 * | 11/2011 | Payen | ........................ | 244/17.11 |
| 2003/0042363 A1 * | 3/2003 | Dussac et al. | ................ | 244/119 |
| 2008/0023582 A1 * | 1/2008 | Payen | ........................ | 244/17.11 |
| 2008/0023583 A1 * | 1/2008 | Payen | ........................ | 244/17.11 |
| 2008/0156934 A1 * | 7/2008 | Guard et al. | ................. | 244/119 |
| 2009/0173826 A1 * | 7/2009 | Estell et al. | ................... | 244/131 |
| 2009/0321574 A1 * | 12/2009 | Erickson et al. | ............. | 244/131 |

FOREIGN PATENT DOCUMENTS

GB     2134059 A  *  8/1984

* cited by examiner

*Primary Examiner* — Benjamin P Lee
(74) *Attorney, Agent, or Firm* — Armstrong Teasdale LLP

(57) ABSTRACT

A flexible mounting assembly allows relative movement between a top and a bottom structural member of an air frame, for instance, a helicopter. The flexible mounting assembly comprises a vertical frame member and an isolation frame member where one of the vertical frame member and the isolation frame member has a pin and the other of the vertical frame member and the frame isolation member has an aperture adapted to slidingly receive the pin in a way to accommodate relative vertical motion therebetween while substantially restraining lateral movement therebetween. The flexible mounting assembly may also include a horizontal shear wall assembly extending between adjacent vertical frame members that accommodates relative vertical motion between top and bottom structural members while substantially restraining lateral movement therebetween.

34 Claims, 10 Drawing Sheets

US 8,317,135 B2

FLEXIBLE MOUNTING ASSEMBLY FOR AN AIR FRAME STRUCTURE

BACKGROUND OF THE INVENTION

The disclosure relates to a flexible mounting assembly for an air frame structure that limits interaction between two structures on the air frame structure while providing a solid closeout between the two structures. As an example, a flexible mounting assembly as described herein may be used on an air frame structure surrounding an existing and self-supporting opening, for instance, a cargo and passenger bay area in a helicopter, thus limiting the interaction between top structural members of the helicopter on which engine components are mounted, bottom structural members defining the bottom of the cargo and passenger bay area of the helicopter, and vertical frame members extending between the top and bottom structural members of the helicopter. Limiting the interaction between the vertical frame members and the top and bottom structural members reduces stress loading at the connection points of these members.

DETAILED DESCRIPTION

Figure 1:
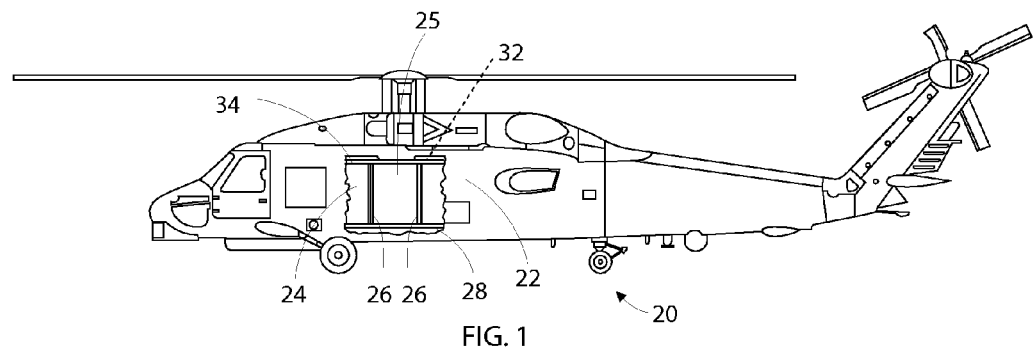
FIG. 1 shows a side view of an exemplary air frame structure comprising a helicopter with a portion of the helicopter's outer side panels exposed to show vertical frame members extending between top and bottom structural members of the helicopter and the general location of a flexible mounting assembly used to limit interaction between the vertical frame members and the top structural member in the exemplary application of a helicopter.
Figure 2:
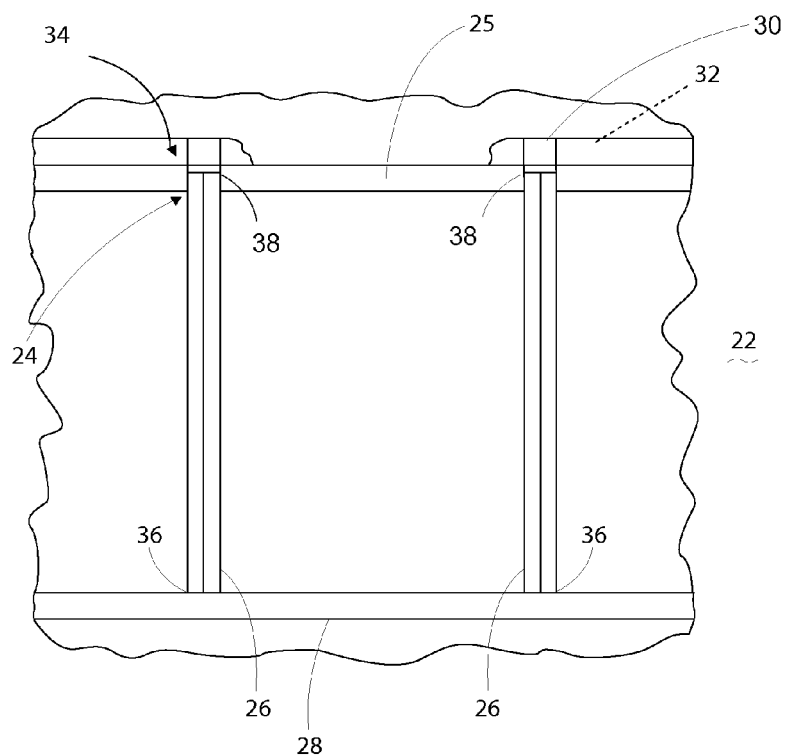
FIG. 2 shows an enlarged view of the partial area of the helicopter of FIG. 1 with the outer side panels removed to provide additional detail of a flexible mounting assembly used to limit interaction between the vertical frame members and the top structural member, including a horizontal shear wall assembly.
Figure 3:
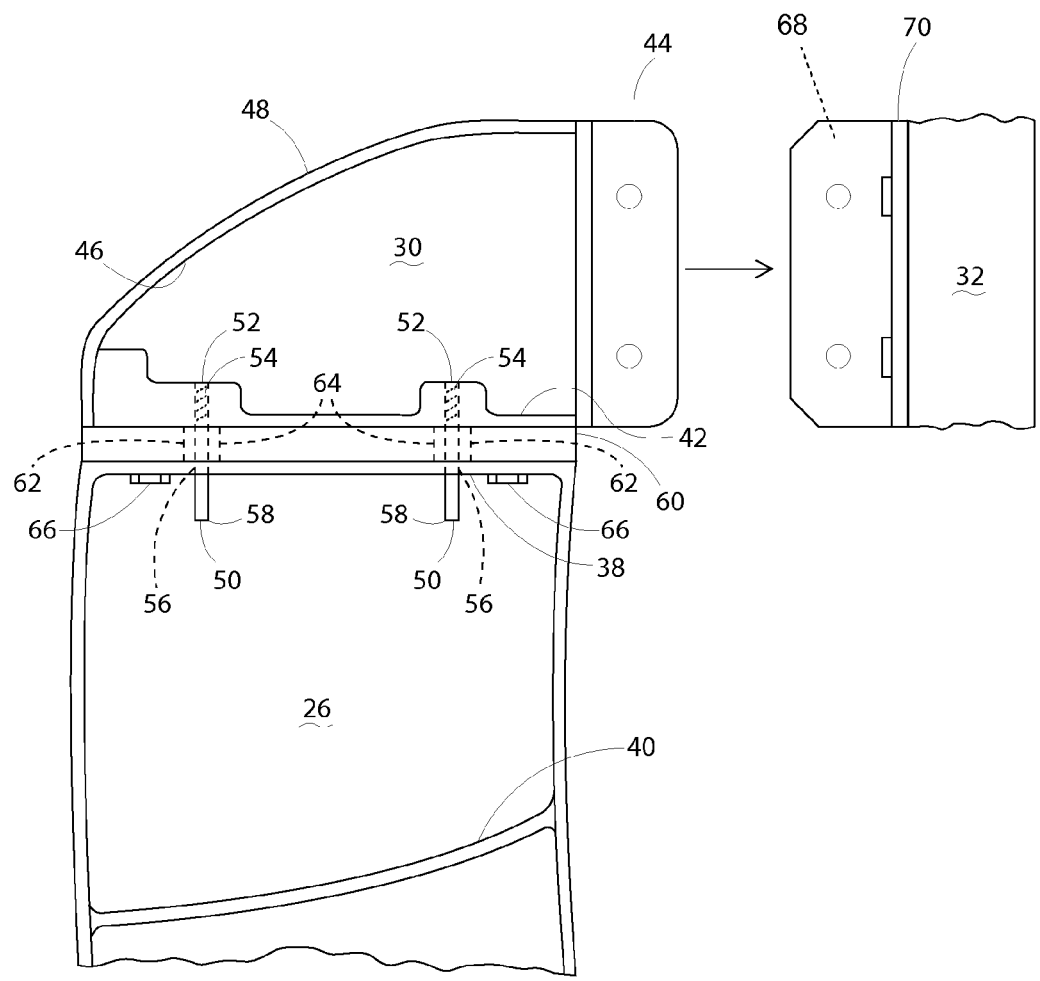
FIG. 3 shows a partial side view of a flexible mounting assembly comprising an isolation frame member operatively securing a vertical frame member to the top structural member of the helicopter.

FIG. 1 shows a side view of a helicopter 20 with a portion of the helicopter's external panels 22 removed to show the general location where a flexible mounting assembly 24 as described below may be utilized, and FIG. 2 shows an enlarged view of a side of the helicopter of FIG. 1 with a portion of the top and side outer panels shown broken away around a self-supporting opening 25 of the helicopter to illustrate additional detail of the flexible mounting assembly. In one application, involving a helicopter such as that shown in FIG. 1, the self supporting opening 25 is generally about the passenger and cargo bay, and the flexible mounting assembly 24 comprises at least a vertical frame member 26 operatively connected to a bottom structural member 28 defining the bottom periphery of the passenger and cargo bay and an isolation frame 30 member operatively connected a top structural member 32 extending longitudinally above the passenger and cargo bay. In addition to the vertical frame member 26 and isolation frame member 30 extending between the top and bottom structural members 28,32 of the helicopter, the flexible mounting assembly may include a horizontal shear wall assembly 34 extending between the vertical frame members and defining a top periphery of the self supporting opening. Generally, in a helicopter application, the top structural member 32 is subjected to upward bending moments when the helicopter increases blade speed, for instance, during take-off. To minimize the amount of stress transferred from the top structural member to other structural members of the helicopter, for instance, the vertical frame members and bottom structural member, a flexible mounting assembly is used. The flexible mounting assembly 24 allows relative vertical motion between the top structural member 32 of the helicopter and the bottom structural member 28 of the helicopter, thereby reducing stress loading in the connection points of the vertical frame member to the top and bottom structural members. Also, allowing relative vertical motion between the top structural member and the bottom structural member of the helicopter facilitates a aircraft manufacturer in installing accesses, such as windows or doors, by eliminating the need to account for the relative movement between the top structural member and the bottom structural member of the helicopter during transient load conditions. As will be described in greater detail below with respect to FIG. 10, an access, such as a door, may be affixed directly to the vertical frame members with the flexible mounting assembly limiting the effect of any distortion on the access caused by bending moments induced in the top structural member during transient load conditions. Although the application described herein focuses on a helicopter and the self supporting opening about a passenger and cargo bay, the flexible mounting system may be used in other applications and other locations.

Referring to FIGS. 2-7 and 10, the vertical frame member 26 of the flexible mounting assembly may have a generally "I" shaped cross section with flanges 36,38 on each longitudinally opposite end. Lateral webs 40 may be provided on the vertical frame member for reinforcement of longitudinal sections of the frame member. The vertical frame member bottom flange 36 may be rigidly secured to the bottom structural member 28 of the helicopter with mechanical fasteners. The flange 38 on the opposite longitudinal end of the vertical frame member may provide a mounting surface for the isolation frame member 30. With isolation frame member 30 rigidly secured to the top structural member 32 of the helicopter, the connection of the isolation frame member to the vertical frame member may allow relative motion between the isolation frame member and the vertical frame member.

FIGS. 3-7 provides additional detail of the isolation frame member 30, the top structural member of the helicopter 32, and the cooperative relationship between the isolation frame member and the vertical frame member 26. In the drawings, portions of the helicopter's outer panels 22 are shown removed to provide additional detail of the underlying structure. The isolation frame member 30 preferably has an attachment portion 42 that is brought into register with the vertical frame member flanged mounting surface 38 during installation. The isolation frame member 30 also has a lateral extension portion 44 on its inboard side that extends in a direction generally transverse to the attachment portion 42. An outboard side 46 of the isolation frame member may be generally tapered to match the upper outer contour of the helicopter adjacent the self supporting opening. The isolation frame member tapered side 46 may have a support surface 48 that allows the outer surface panels of the helicopter to be secured thereto. The isolation frame member attachment portion 42 may have a flanged surface that matches the flanged mounting surface 38 of the vertical frame member.

Preferably, the isolation frame member 30 and the vertical frame member 26 are connected with pins 50 that allow relative vertical motion therebetween while constraining inboard-outboard and forward-aft motion. In one example, the topside (exemplary orientation per the drawings) surface of the isolation frame member attachment portion 42 may be formed with bosses 52 with threaded holes 54. Preferably, the attachment portion threaded holes 54 threadably receive the pins 50, and the pins 50 depend from the isolation frame member attachment portion flange 42 through holes 56 on the vertical frame member mounting surface flange 38. Distal ends 58 of the pins may have a driven end to receive the point of a tool (e.g., a slot to accept a slotted screwdriver) which may be positioned adjacent the vertical frame member in the direction of the vertical frame member mounting surface flange. The tool may be used to thread the pins into the bosses of the attachment portion of the isolation frame member. In the alternative, threaded holes may be provided on the vertical frame member flanged mounting surface and through holes provided on the isolation frame member attachment portion with the pins threaded into the vertical frame member flanged mounting surface and passing through the isolation frame member attachment portion. In such an arrangement, bosses may also be provided on the underside (exemplary orientation per the drawings) of the vertical frame member flanged mounting surface. The through holes (whether provided in the isolation frame member attachment portion or the vertical frame member flanged mounting surface) may be sized to allow the pins to slidingly pass therethrough thereby permitting relative vertical movement while constraining inboard outboard and forward aft motion. Linear bearings may also be locked in the through holes (whether provided in the isolation frame member attachment portion or the vertical frame member flanged mounting surface) to allow the pins to slidingly pass through the bearing center hole thereby permitting relative vertical movement while constraining inboard outboard and forward aft motion.

A spacer 60 may be disposed between the vertical frame member mounting surface 38 and the isolation frame member attachment portion 42. The spacer 60 is particularly useful in retrofitting existing helicopters with a flexible mounting assembly as there often tends to be some variation in the overall height of the passenger and cargo bay among helicopters. The use of the spacer allows a manufacturer or retrofitter to stock a standard size vertical frame member and use a variable width spacer to accommodate differences in the height of the self supporting opening of individual helicopters. The spacer 60 may have holes 62 that are co-linearly aligned with the holes 56 in the vertical frame member flanged mounting surface and the pins 50. The spacer holes 62 may be sized to allow the pins to slidingly pass therethrough to allow vertical motion while constraining inboard-outboard motion and forward-aft motion. Linear bearings 64 may be provided in the spacer holes to allow the pins to slidingly pass through the bearing center hole thereby permitting relative vertical movement while constraining inboard outboard and forward aft motion. In one example, the spacer may be removably secured to the vertical frame member mounting surface 38 with mechanical fasteners 66, thereby enabling maintenance personnel to access the spacer and the bearings of the spacer for replacement if worn. For instance, mechanical fasteners on the vertical frame member mounting surface may be removed and the pin unthreaded from the isolation frame member, thereby allowing the spacer to be removed between the isolation frame member and the vertical frame member for replacement of the bearings. The spacer may also be removably secured to the isolation frame member attachment portion.

In the arrangement described above, during transient load conditions, the isolation frame member may move upward relative to the vertical frame member with the pins being maintained in register with the spacer linear bearings and vertical frame member flanged mounting surface pin holes. The pin connection between the vertical frame member and the isolation frame member allows for relative vertical movement therebetween while sufficiently maintaining forward-aft and inboard-outboard load-carrying capability of the frames.

The isolation frame member extension portion 44 extends generally laterally (exemplary orientation per the drawings) in a direction transverse to the attachment portion 42. The extension portion 44 preferably is received in a channel 68 of an anchor member 70 that is rigidly secured to the top structural member 32 of the helicopter. The anchor member channel 68 may have a width opening that closely matches the axial thickness of the vertical frame member extension portion 44 to constrain forward-aft motion. The isolation frame member extension portion 44 has a relatively large flat lateral area that is particularly useful in fitting up the isolation frame member to the top structural member of the helicopter. As mentioned previously, there often tends to be dimensional variation among helicopters. To allow a manufacturer or retrofitter to stock or supply one size of isolation frame member 30 and one size of anchor member 70, the extension portion may be formed with a large flat lateral area. During installation, the extension portion may be received in the channel of the anchor member and after ensuring proper alignment and fit between the vertical frame member, the isolation frame member, the anchor member, and the top structural member, the installer may form holes on-location on one or more of the isolation frame member extension portion and the anchor member in the exact location needed (e.g., match drilling), and the anchor member and isolation frame member may thereafter be secured together with mechanical fasteners.

Figure 4:
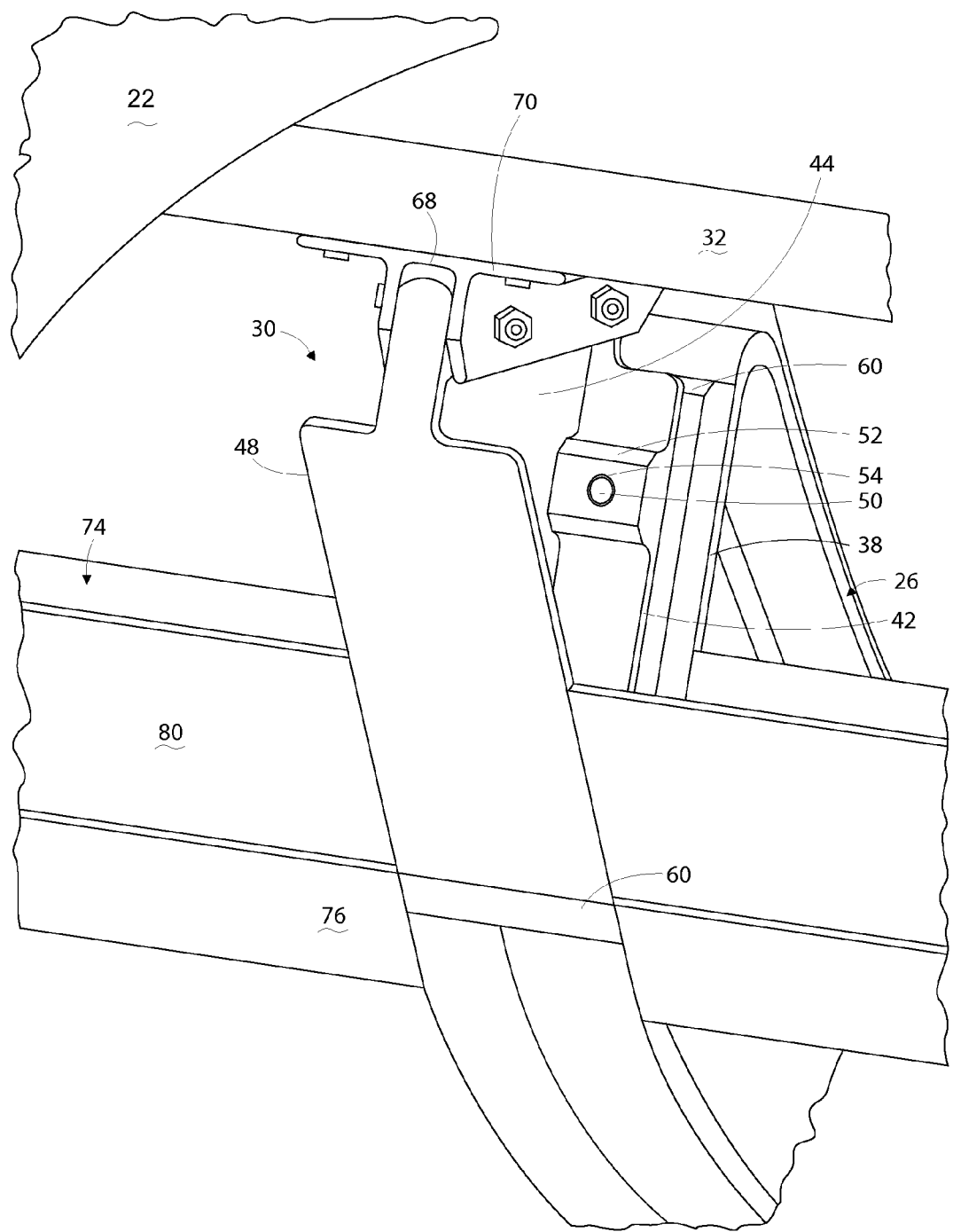
FIG. 4 shows a partial top perspective view of the flexible mounting assembly with a portion of the top outer surface panels of the helicopter shown as broken away to illustrate the isolation frame member and its connection to the top structural member of the helicopter, and the horizontal shear wall assembly.
Figure 5:
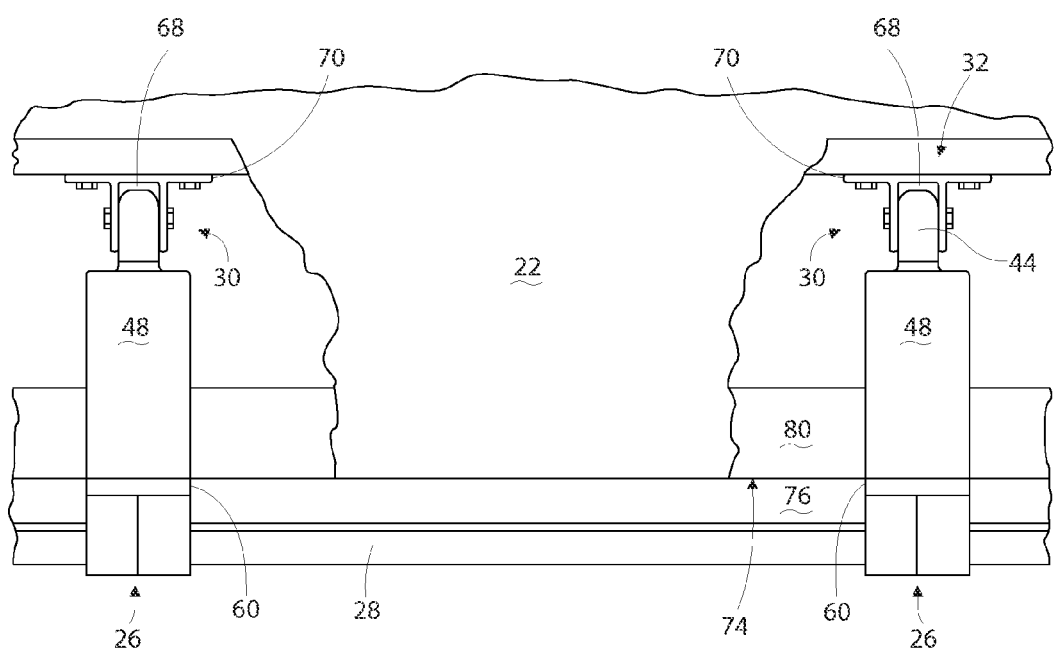
FIG. 5 shows a partial top view of the flexible mounting assembly with a portion of the top outer surface panels of the helicopter shown as broken away to illustrate the isolation frame members' connection to the top structural member, and the horizontal shear wall assembly.
Figure 6:
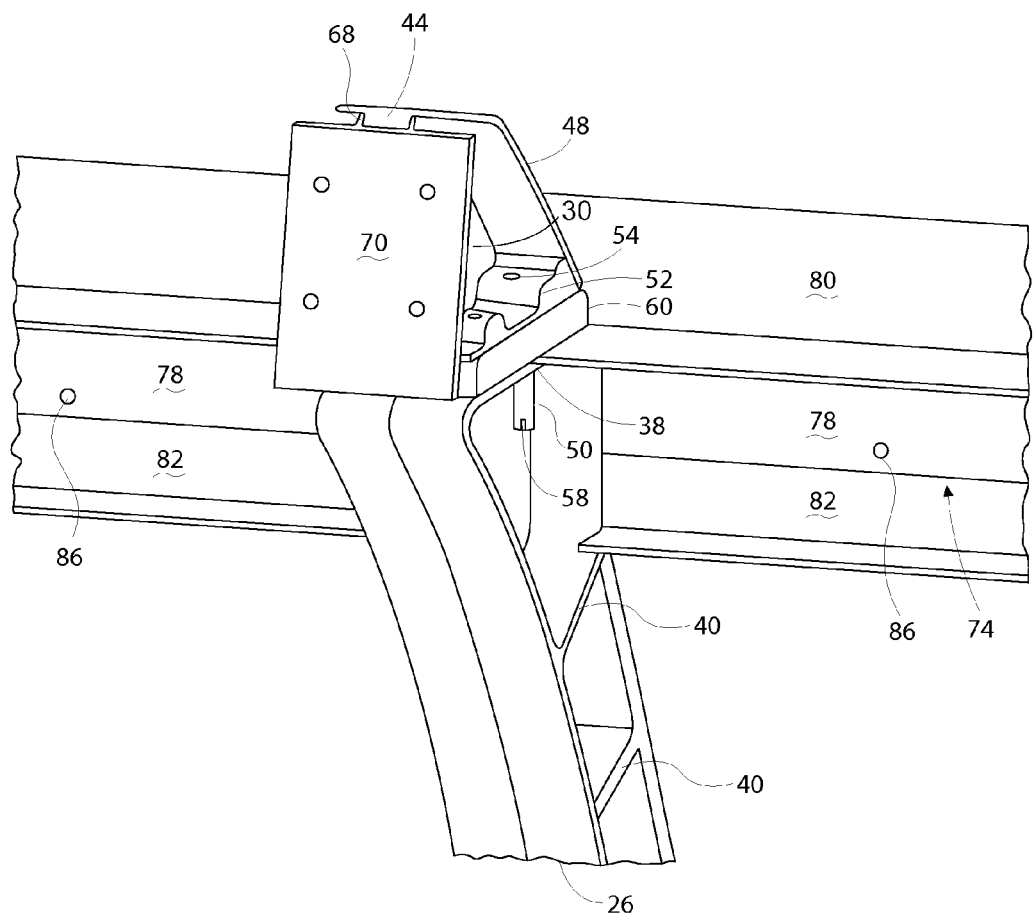
FIG. 6 shows a partial rear perspective view of the flexible mounting assembly including the vertical frame member, isolation frame member and horizontal shear wall assembly.
Figure 7:
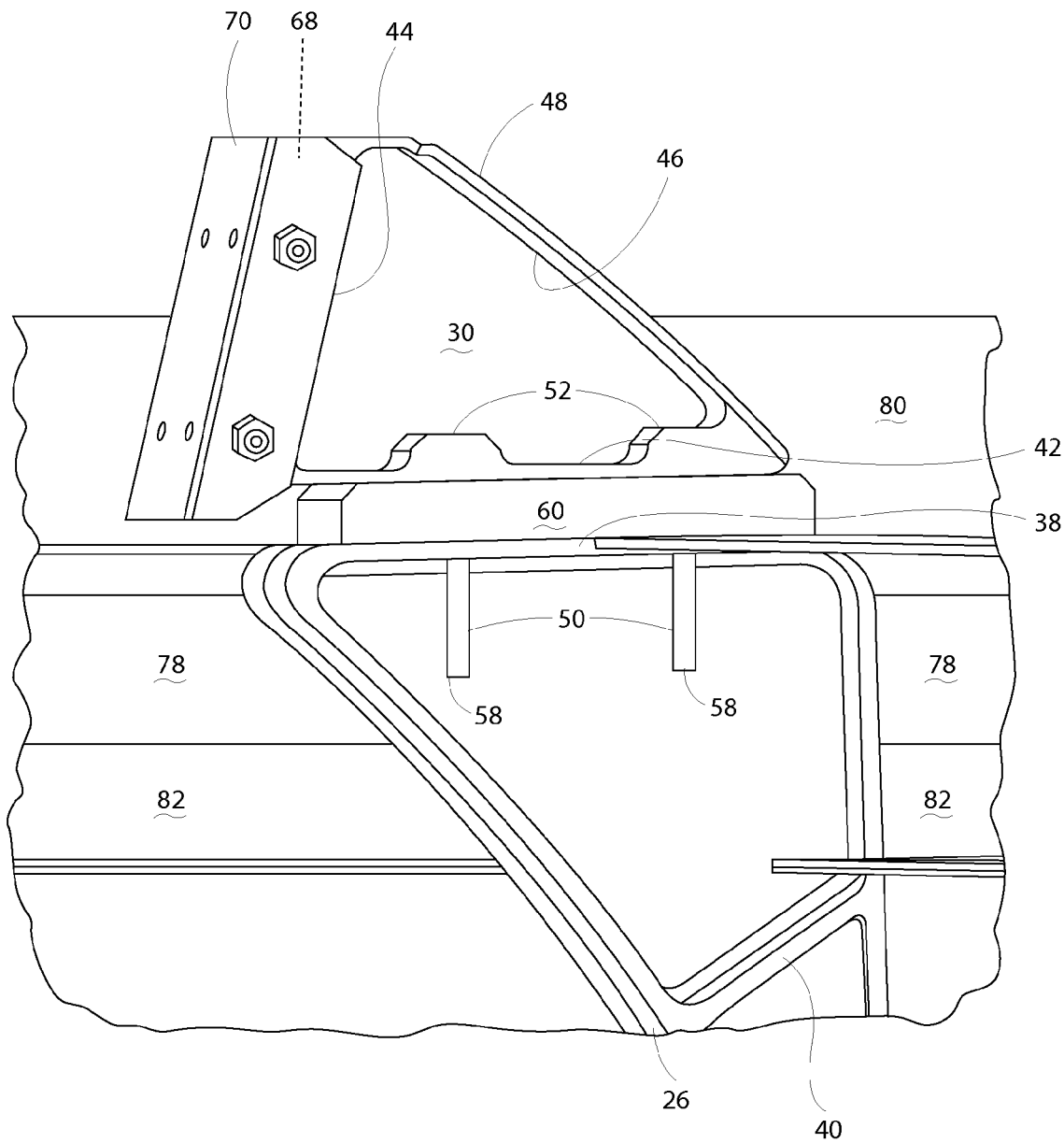
FIG. 7 shows a partial rear and side perspective view of the flexible mounting assembly including the vertical frame member, isolation frame member and horizontal shear wall assembly.
Figure 8:
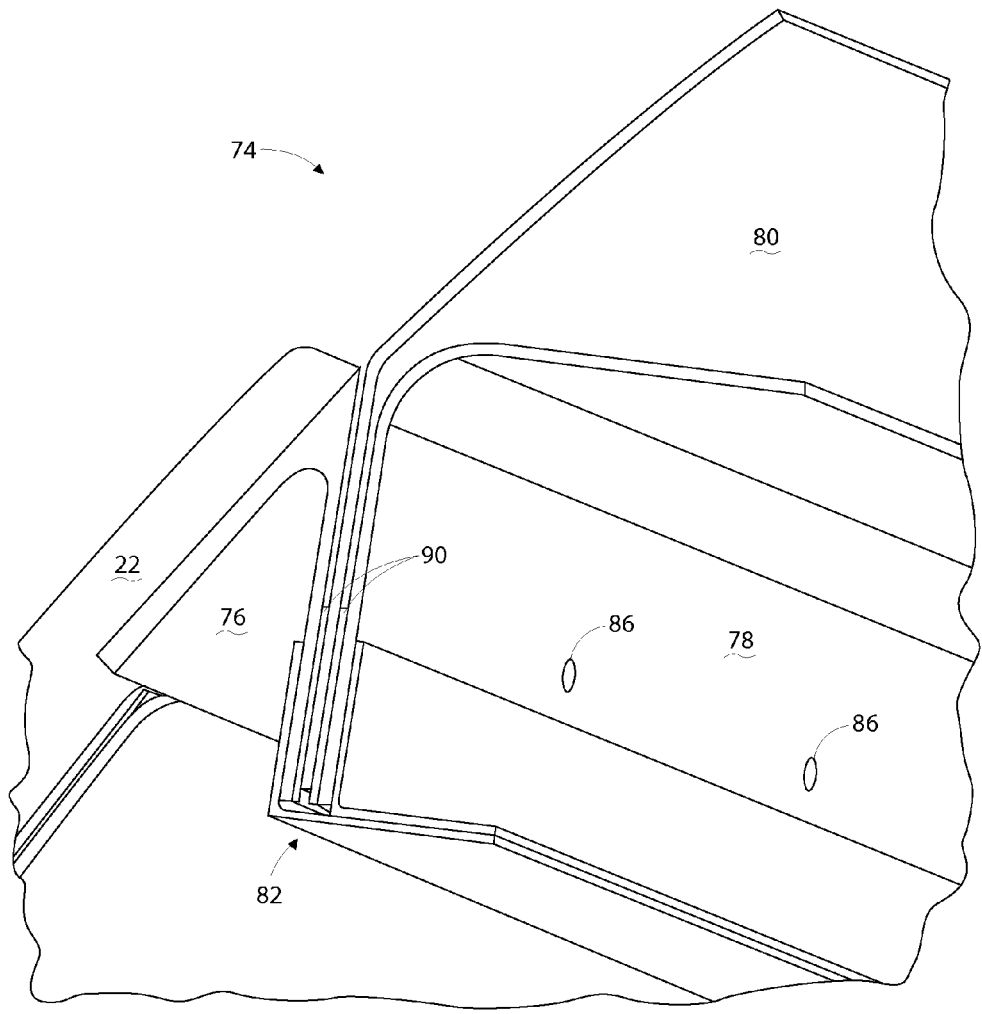
FIG. 8 shows a partial rear and side perspective view of the horizontal shear wall assembly comprising an inboard and outboard shear wall and a middle shear wall extending therebetween.
Figure 9:
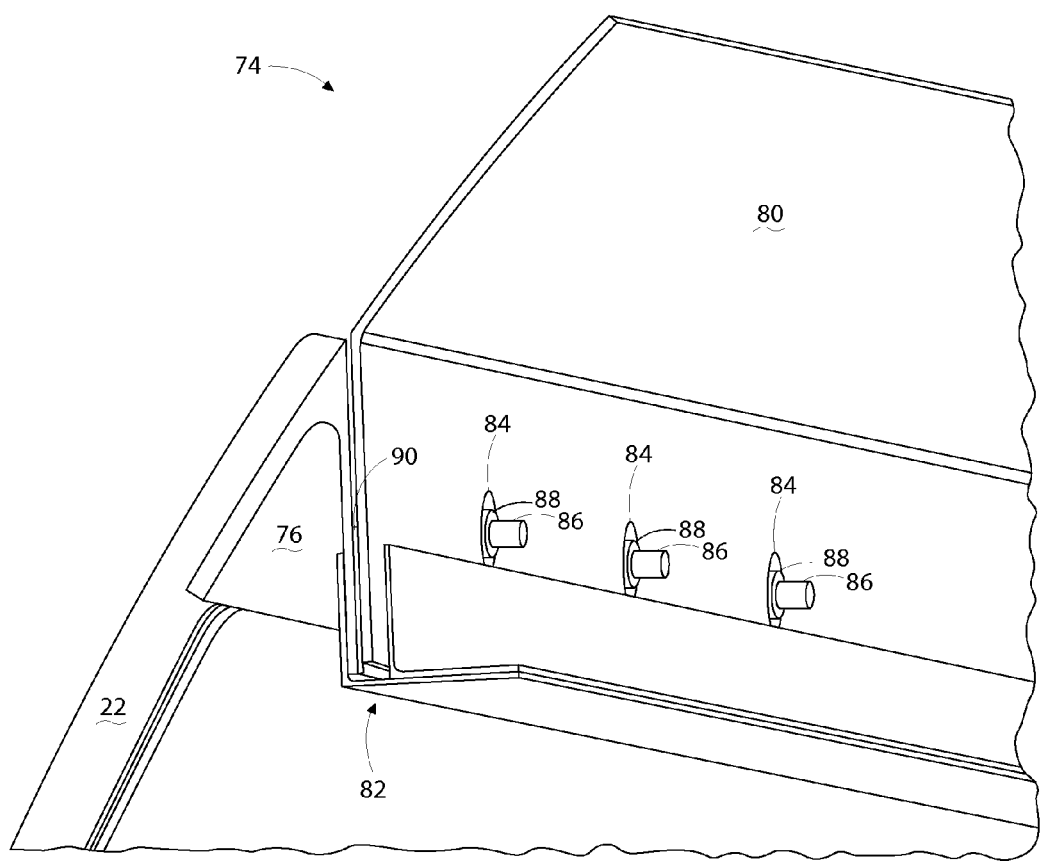
FIG. 9 shows a partial rear and side perspective view of the horizontal shear wall assembly of FIG. 8 with the inboard shear wall removed to provide additional detail of a middle shear wall and its connection with an outboard shear wall.

FIGS. 4-6 show the general arrangement of the horizontal shear wall assembly 74 adjacent the self supported opening 25, and FIGS. 8-9 show additional detail of the shear wall assembly. To allow a solid closeout between the outer surface panels mounted to the top structural member of the helicopter and the outer surface panels mounted to the vertical frame members, the flexible mounting assembly 24 may include the horizontal shear wall assembly 74. The horizontal shear wall assembly also allows relative vertical movement of the existing structure while maintaining a forward-aft and inboard-outboard load-carrying capability for the frame. The horizontal shear wall assembly 74 may define the top periphery of the self supporting opening 25 of the helicopter and may extend between adjacent the vertical frame members. The shear wall assembly 74 may include an outboard shear wall 76 and an inboard shear wall 78, which, as explained below in greater detail, are secured to the vertical frame members, and together with the vertical frame members support an access that may be formed in the self supporting opening and outer surface panels of the helicopter. The shear wall assembly 74 may also include a middle shear wall 80 slidingly disposed between the outboard and inboard shear walls 76,78. As explained below in greater detail, the middle shear wall 80 supports outer surface panels of the helicopter that may be connected to the top structural members of the helicopter. As the middle shear wall 80 is configured for relative sliding motion between the outboard and inboard shear walls 76,78, the middle shear wall may move vertically relative to the outboard and inboard shear walls during transient load conditions of the helicopter, thereby reducing the interaction of the top structural member with the vertical frame members and distortion of any accesses that may be disposed between the vertical frame members.

As shown in the drawings, the middle shear wall 80 may be connected to the isolation frame member tapered mounting surface 48 and the outboard and inboard shear walls 76,78 may be secured to the vertical frame member 26. The horizontal shear wall assembly 74 may also comprise a channel 82 for housing the outboard, the inboard, and the middle shear walls 76,78,80. The channel 82 may also be affixed to the vertical frame members 26 with the inboard and outboard shear walls, thus allowing the middle shear wall to move vertical therebetween during transient load conditions of the helicopter. The middle shear wall 80 may be formed with vertically elongated slots 84 and the inboard and outboard shear walls may be fixed together with pins 86 directed through slots of the middle shear wall, thereby enabling the middle shear wall to move in a vertical direction relative to the inboard and outboard shear walls. A bearing 88 may be disposed in each of the middle shear wall slots 84 to minimize fretting or wear. In FIG. 9, the inboard shear wall 78 has been removed to provide additional detail of the middle shear wall 80, the slots 84, and the bearings 88. A seal 90 may be formed on the outboard and inboard shear walls 76,78 to minimize fretting or wear with the middle shear wall 80 during sliding motion. The seal may be provided on either of the inboard or outboard shear walls as shown in the drawings or on the inboard and outboard sides of the middle shear wall.

Figure 10:
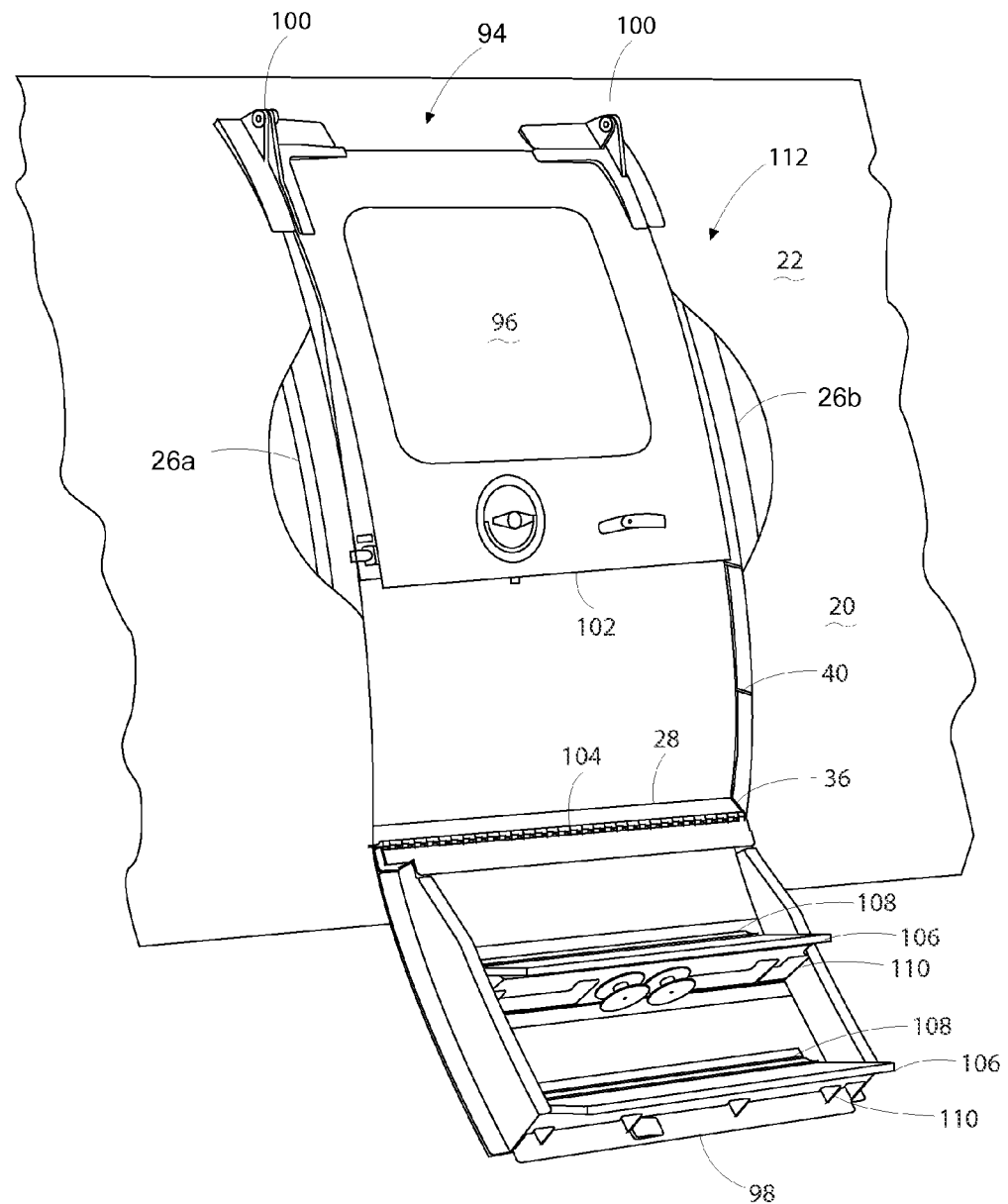
FIG. 10 shows a partial perspective view of a helicopter with a clamshell door access mounted on vertical frame members with a portion of the side outer panels of the helicopter removed to illustrate the two vertical frame members supporting the door.

With the above in mind, an access 94 may be mounted to adjacent vertical frame members 26a,26b (FIG. 10) in a manner that sufficiently isolates the access from the top structural member of the helicopter and prevents distortion to the access 94 and the surrounding exterior panels 22 caused during transient load conditions of the helicopter. FIG. 10 provides an example of an access 94 comprising a clamshell-type access with top and bottom door portions 96,98 that may be moved toward and away from each other to provide ingress into and egress out of the personnel and cargo bay of the helicopter. As shown in FIG. 10, the top door portion 96 has a pivoting connection 100 to the vertical frame members 26a,26b and a portion of the outer surface panels 22 of the helicopter have been removed to show the vertical frame members. The pivoting connection 100 enables the top door portion 96 to be rotated relative to the horizontal shear wall assembly 74 between an open position in which a distal end 102 of the top door portion is generally directed away from the bottom structural member 28 of the helicopter and a closed position in which the top door portion distal end is generally directed toward the bottom structural member. Because the top door portion 96 and its pivoting connection 100 are sufficiently isolated from the top structural member of the helicopter, distortion of the clamshell access door during transient load conditions of the helicopter is minimized.

Figure 11:
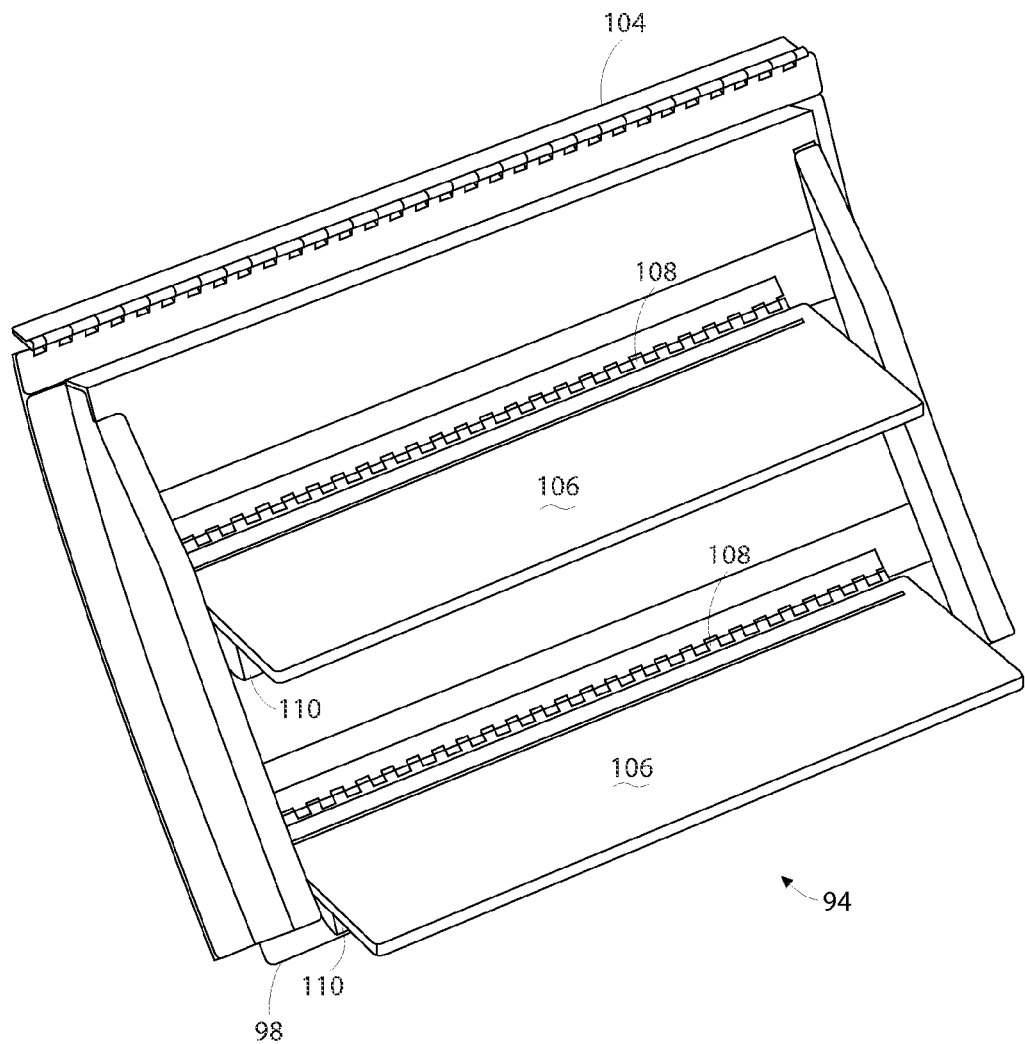
FIG. 11 shows a top perspective view of a bottom portion of the clamshell door showing a pivoting connection between the steps and the bottom portion of the door.

As shown in FIG. 10, the bottom door portion 98 of the access may be secured directly to the bottom structural member 28 of the helicopter. FIG. 10 shows the bottom door portion 98 being pivotally connected to the bottom structural member 28 with a "piano-style" hinge 104. During ingress into and egress out of the cargo bay of the helicopter, the bottom door portion 98 may function as a support for steps 106. The steps 106 may be pivotally connected to the bottom door portion with a "piano"-style hinge 108 (FIG. 11) so as to allow each of the steps to move between a deployed position in which the step is generally horizontal (exemplary orientation per the drawings) and a stowed position in which the step is generally vertically aligned with the bottom door portion in the closed position. Stops or rib members 110 extending forward to aft on the bottom door portion 98 may support each of the steps 106 in the horizontal position with the bottom door portion in the open position.

Because the access 94 is isolated from the top structural member 32 of the helicopter, the access 94 including vertical frame members 26a,26b and horizontal shear wall assembly 74 may be prefabricated and staged as necessary during manufacture or retrofit operations of the helicopter. For instance, a integrated door assembly 112 comprising vertical frame members 26a,26b, a horizontal shear wall assembly 74 extending therebetween, and at least a top door portion 96 may be installed on the helicopter as an integral single unit. For instance, an integrated door assembly may be installed by (i) securing the vertical frame members to the bottom structural member, (ii) installing an isolation frame member on each of the vertical frame members' flanged mounting surface, (iii) securing the isolation frame member to the anchor member, and (iv) completing any required interior close out work. The bottom door portion may then be installed by mounting the hinge to the bottom structural member. Once the access door is installed in the helicopter, the outer surface side panels may be fitted up and around the vertical frame members for aesthetic purposes and maintaining the aerodynamic characteristics of the aircraft.

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed herein were meant to be illustrative only and not limited as to the scope of the invention which is to be given the full breadth of the appended claims and any equivalents thereof.

What is claimed is:

1. A flexible mounting assembly allowing relative vertical motion between a top structural member of a helicopter and a bottom structural member of a helicopter, the mounting assembly comprising:
   a vertical frame member with a first end adapted to be secured to the bottom structural member and a second end longitudinally opposite the first end;
   an isolation frame member having a generally vertical extension portion adapted to be secured to the top structural frame member and an attachment portion generally transverse to the extension portion; and
   one of the vertical frame member second end and the isolation frame member attachment portion having at least one generally vertically oriented pin member and the other of the vertical frame member second end and the isolation frame member attachment member having at least one aperture adapted to slidingly receive the pin member in a way to accommodate relative vertical motion between the vertical frame member and isolation frame member and substantially restrain lateral movement therebetween.

2. The flexible mounting assembly of claim 1, further comprising a spacer mounted to one of the vertical frame member second end and the isolation frame member attachment portion, the spacer having an aperture to receive the at least one pin.

3. The flexible mounting assembly of claim 2, wherein the spacer has a bearing that forms the aperture.

4. The flexible mounting assembly of claim 1, wherein the pin is removably threadably connected to the isolation frame member attachment portion.

5. The flexible mounting assembly of claim 1, wherein the isolation frame member extension portion is adapted to be received in a channel of an anchor member mounted to the top structural member.

6. The flexible mounting assembly of claim 1, further comprising:
   a horizontal shear wall assembly comprising:
      an outboard shear wall being operatively mountable to the vertical frame member adjacent to the vertical frame member second end and extending generally horizontally in relation thereto;
      an inboard shear wall being operatively mountable to the vertical frame member adjacent to the vertical frame member second end and extending generally horizontally in relation thereto; and
      a middle shear wall being operatively mountable to the top structural member, the middle shear wall extending alongside and slidingly disposed between the inboard and the outboard shear walls.

7. The flexible mounting assembly of claim 6, further comprising a channel member operatively mounted to the vertical frame member adjacent to the vertical frame member second end and extending generally horizontally in relation thereto, the channel member having a channel dimensioned to receive the inboard, outboard and middle shear walls.

8. The flexible mounting assembly of claim 6, wherein the middle shear wall forms a seal with at least one of the inboard shear wall and the outboard shear wall.

9. The flexible mounting assembly of claim 6, further comprising a pin mounted to and extending between the inboard and outboard shear walls with the middle shear wall adapted to move vertically therebetween.

10. The flexible mounting assembly of claim 9, wherein the middle shear wall has a slot and a bearing in the slot that receives the pin.

11. A flexible mounting assembly allowing relative vertical motion between a top structural member of a helicopter and a vertical frame member of a helicopter, the mounting assembly comprising:
   a vertical frame member with a first end adapted to be secured to a bottom structural member of the helicopter and a second end longitudinally opposite the first end;
   an outboard shear wall operatively mounted to the vertical frame member second end and extending generally horizontally in relation thereto;
   an inboard shear wall operatively mounted to the vertical frame member second end and extending generally horizontally in relation thereto; and
   a middle shear wall being operatively mountable to the top structural member, the middle shear wall extending alongside and slidingly disposed between the inboard and the outboard shear walls.

12. The flexible mounting assembly of claim 11, further comprising a channel member operatively mounted to the vertical frame member adjacent to the vertical frame member second end and extending generally horizontally in relation thereto, the channel member having a channel dimensioned to receive the inboard, outboard and middle shear walls.

13. The flexible mounting assembly of claim 11, wherein the middle shear wall forms a seal with at least one of the inboard shear wall and the outboard shear wall.

14. The flexible mounting assembly of claim 11, further comprising a pin mounted to and extending between the inboard and outboard shear walls with the middle shear wall adapted to move vertically therebetween.

15. The flexible mounting assembly of claim 14, wherein the middle shear wall has a slot and a bearing in the slot that receives the pin.

16. The flexible mounting assembly of claim 11, further comprising:
   an isolation frame member having a generally vertical extension portion adapted to be secured to the top structural frame member and an attachment portion generally transverse to the extension portion; and
   one of the vertical frame member second end and the isolation frame member attachment portion having at least one generally vertically oriented pin member and the other of the vertical frame member second end and isolation frame member attachment member having at least one aperture adapted to slidingly receive the pin member in a way to accommodate relative vertical motion between the vertical frame member and isolation frame member and substantially restrain lateral movement therebetween.

17. The flexible mounting assembly of claim 16, further comprising a spacer mounted to one of the vertical frame member second end and the isolation frame member attachment portion, the spacer having an aperture to receive the at least one pin.

18. The flexible mounting assembly of claim 17, wherein the spacer has a bearing that forms the aperture.

19. The flexible mounting assembly of claim 16, wherein the pin is removably threadably connected to the isolation frame member attachment portion.

20. The flexible mounting assembly of claim 16, wherein the isolation frame member extension portion is adapted to be received in a channel of an anchor member mounted to the top structural member.

21. A flexible mounting assembly allowing relative vertical motion between a top structural member of a helicopter and a bottom structural member of a helicopter, the mounting assembly comprising:

first and second vertical frame member assemblies extending between the top structural member and the bottom structural members, the first and second vertical frame member assemblies being spaced apart from one another along a longitudinal axis of the helicopter and defining a frame for supporting an access associated with the helicopter, each of the first and second vertical frame member assemblies comprising:

a vertical frame member with a first end adapted to be secured to the bottom structural member and a second end longitudinally opposite the first end;

an isolation frame member having a generally vertical extension portion adapted to be secured to the top structural frame member and an attachment portion generally transverse to the extension portion; and one of the vertical frame member second end and the isolation frame member attachment portion having at least one generally vertically oriented pin member and the other of the vertical frame member second end and isolation frame member attachment member having at least one aperture adapted to slidingly receive the pin member in a way to accommodate relative vertical motion between the vertical frame member and isolation frame member and substantially restrain lateral movement therebetween; and a horizontal shear wall assembly extending generally horizontal between the first and the second vertical frame member assemblies, the horizontal shear wall assembly comprising:

an outboard shear wall being operatively mountable to the first and the second vertical frame members adjacent to the second end of each respective vertical frame member and extending generally horizontally in relation thereto;

an inboard shear wall being operatively mountable to the vertical frame member adjacent to the second end of each respective vertical frame member and extending generally horizontally in relation thereto; and a middle shear wall being operatively mountable to the top structural member, the middle shear wall extending alongside and slidingly disposed between the inboard and the outboard shear walls.

22. The flexible mounting assembly of claim 21, further comprising a channel member operatively mounted to the vertical frame member adjacent to the vertical frame member second end and extending generally horizontally in relation thereto, the channel member having a channel dimensioned to receive the inboard, outboard and middle shear walls.

23. The flexible mounting assembly of claim 21, wherein the middle shear wall forms a seal with at least one of the inboard shear wall and the outboard shear wall.

24. The flexible mounting assembly of claim 21, further comprising a pin mounted to and extending between the inboard and outboard shear walls with the middle shear wall adapted to move vertically therebetween.

25. The flexible mounting assembly of claim 24, wherein the middle shear wall has a slot and a bearing in the slot that receives the pin.

26. The flexible mounting assembly of claim 21, further comprising a spacer mounted to one of the vertical frame member second end and the isolation frame member attachment portion, the spacer having an aperture to receive the at least one pin.

27. The flexible mounting assembly of claim 26, wherein the spacer has a bearing that forms the aperture.

28. The flexible mounting assembly of claim 21, wherein the pin is removably threadably connected to the isolation frame member attachment portion.

29. The flexible mounting assembly of claim 21, wherein the isolation frame member extension portion is adapted to be received in a channel of an anchor member mounted to the top structural member.

30. The flexible mounting assembly of claim 21, wherein the access comprises a door with top and bottom door portions being movable between an open position in which the distal ends of the top and bottom door portions are spaced from each other and a closed position in which the top door and the bottom door portions abut to form a continuous structure.

31. The flexible mounting assembly of claim 30, wherein the top door portion is operatively pivotally connected to the first and second vertical frame members enabling the top door portion to be rotated relative to horizontal shear wall assembly between a first position in which a distal end of the top door portion is generally directed away from the bottom structural member with the top door portion in the open position and a second position in which the top door portion distal end is generally directed toward the bottom structural member with the top door portion in the closed position.

32. The flexible mounting assembly of claim 31, wherein the bottom door portion is operatively pivotally connected to the bottom structural member enabling the bottom door portion to be rotated relative to bottom structural member between a first position in which a distal end of the bottom door portion is generally directed away from the top structural member with the bottom door portion in the open position and a second position in which the bottom door portion distal end is generally directed toward the top structural member with the bottom door portion in the closed position.

33. The flexible mounting assembly of claim 32, wherein the bottom door portion has at least one step with a length and a width transverse to the length.

34. The flexible mounting assembly of claim 33, wherein the step is pivotally connected to the bottom door portion and enabled to move between a deployed position in which the step length and the step width define a generally horizontal plane with the bottom door portion in the open position, and a stowed position in which the step length and width define a generally vertical plane with the bottom door portion in the closed position.

* * * * *